US009916098B2

(12) United States Patent
Gay et al.

(10) Patent No.: US 9,916,098 B2

(45) Date of Patent: Mar. 13, 2018

(54) REDUCING READ LATENCY OF MEMORY MODULES

(71) Applicant: HEWLETT PACKARD ENTERPRISE DEVELOPMENT LP, Houston, TX (US)

(72) Inventors: Raphael Gay, Fort Collins, CO (US); Siamak Tavallaei, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/114,098

(22) PCT Filed: Jan. 31, 2014

(86) PCT No.: PCT/US2014/014024

§ 371 (c)(1),
(2) Date: Jul. 26, 2016

(87) PCT Pub. No.: WO2015/116135

PCT Pub. Date: Aug. 6, 2015

(65) Prior Publication Data

US 2016/0371015 A1 Dec. 22, 2016

(51) Int. Cl.

*G06F 12/08* (2016.01)
*G06F 3/06* (2006.01)

(Continued)

(52) U.S. Cl.

CPC .......... *G06F 3/0611* (2013.01); *G06F 3/0659* (2013.01); *G06F 3/0673* (2013.01);

(Continued)

(58) Field of Classification Search

CPC .... G06F 3/0611; G06F 3/0659; G06F 3/0673; G06F 12/0802; G06F 1233/1689; G06F 2212/1024; G06F 2212/60

(Continued)

(56) References Cited

U.S. PATENT DOCUMENTS 6,389,514 B1 * 5/2002 Rokicki .............. G06F 12/0215 365/230.03
6,397,299 B1 5/2002 Meyer (Continued)

FOREIGN PATENT DOCUMENTS

TW 200828336 A 7/2008

OTHER PUBLICATIONS

International Searching Authority, The International Search Report and the Written Opinion, dated Oct. 27, 2014, 10 Pages.

(Continued)

*Primary Examiner* — Pho M Luu
*Assistant Examiner* — Xiaochun L Chen
(74) *Attorney, Agent, or Firm* — Hewlett Packard Enterprise Patent Department

(57) ABSTRACT

Example implementations relate to using an alternative memory (AltMem) to reduce read latency of a memory module having a dynamic random-access memory (DRAM). In example implementations, write data may be written to the DRAM and to the AltMem. A read command may be issued to the AltMem if a DRAM read latency time for executing the read command is greater than an AltMem read latency time for executing the read command. Data read from the AltMem in response to the read command may be received.

16 Claims, 11 Drawing Sheets

700

Reserve, in AltMem, a memory space as large as that of DRAM — 702

Transmit write data for storing in DRAM and AltMem — 704

Receive, if DRAM read latency time for executing read command is greater than AltMem read latency time for executing read command, data read from AltMem — 706

(51) Int. Cl.

| | |
|---|---|
| ***G06F 13/16*** | (2006.01) |
| ***G06F 12/0802*** | (2016.01) |
| *G06F 12/02* | (2006.01) |
| *G06F 12/06* | (2006.01) |

(52) U.S. Cl.
CPC ...... *G06F 12/0802* (2013.01); *G06F 13/1689* (2013.01); *G06F 12/0238* (2013.01); *G06F 12/0638* (2013.01); *G06F 2212/1024* (2013.01); *G06F 2212/205* (2013.01); *G06F 2212/60* (2013.01)

(58) Field of Classification Search
USPC .......................................................... 365/149
See application file for complete search history.

(56) References Cited

U.S. PATENT DOCUMENTS

| | | | |
|---|---|---|---|
| 6,496,192 | B1 | 12/2002 | Shreesha et al. |
| 7,188,217 | B2 | 3/2007 | Jeddeloh |
| 7,593,263 | B2 | 9/2009 | Soklov et al. |
| 7,774,556 | B2 | 8/2010 | Karamcheti et al. |
| 8,219,746 | B2 | 7/2012 | Tremaine |
| 8,422,314 | B2 | 4/2013 | Lee |
| 2012/0166891 | A1 | 6/2012 | Dahlen et al. |
| 2013/0318196 | A1 | 11/2013 | Yamamoto et al. |

OTHER PUBLICATIONS

Lee, D. et al.; "Tiered-latency DRAM: a Low Latency and Low Cost DRAM Architecture"; Jan. 11, 2013; 12 pages.

* cited by examiner

REDUCING READ LATENCY OF MEMORY MODULES

BACKGROUND

Dynamic random-access memory (DRAM) devices may be used to store data. Multiple pages on a DRAM may be open at the same time. If a DRAM read command is directed at an address that is not on an open page, an open page on the DRAM may be closed before a page having the desired address is opened.

BRIEF DESCRIPTION OF THE DRAWINGS

The following detailed description references the drawings, wherein.

DETAILED DESCRIPTION

A read command that results in a page miss on a DRAM may have a long read latency time because the page having the desired address may have to be opened, and an existing open page may have to be closed first if there are no spare resources (e.g., banks) to open the new page. As used herein, the term "read latency time", as used with respect to a read command, should be understood to refer to a length of time from the start of issuing the read command, to when data read in response to the read command is ready to be transmitted back to a memory controller. DRAM devices may be used with caches to reduce read latency time, but caches may be expensive and may not have enough capacity to store all of the data stored in DRAM. If a read command results in a page miss on a cache, the desired data may have to be copied from DRAM to the cache and then accessed from the cache, resulting in a long read latency time.

An alternative memory (AltMem) may be used in conjunction with a DRAM to reduce DRAM read latency times. As used herein, the terms "alternative memory" and "AltMem" should be understood to refer to any memory that is suitable for storing data that is stored in DRAM, and that may provide such data more quickly than DRAM. Examples of AltMem may include phase-change memory (PCM), spin-transfer torque random-access memory (STT-RAM), and memristors. An AltMem may be cheaper and have higher capacity than a cache, and may be able to store as much data as DRAM, if not more. An AltMem may have a lower throughput than DRAM, but may provide data faster than a DRAM if the DRAM has to close and open pages when executing a read command. In light of the above, the present disclosure provides for storing the same data in an AltMem as is stored in a DRAM, and deciding on a per command basis whether to read data from the AltMem or from the DRAM.

Figure 1:
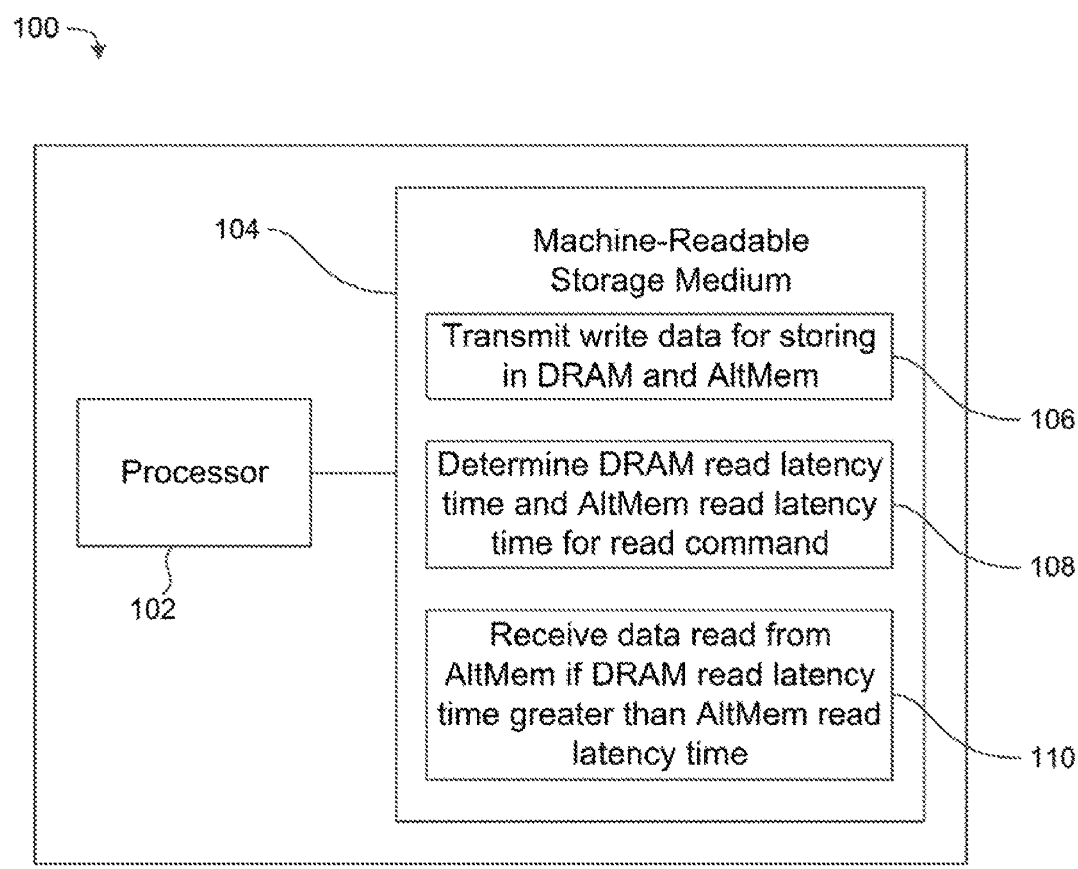
FIG. 1 is a block diagram of an example memory controller that includes a machine-readable storage medium encoded with instructions to enable reducing read latency of a memory module.

Referring now to the drawings, FIG. 1 is a block diagram of an example memory controller 100 that includes a machine-readable storage medium encoded with instructions to enable reducing read latency of a memory module. As used herein, the terms "include", "have", and "comprise" are interchangeable and should be understood to have the same meaning. Memory controller 100 may be communicatively coupled to a memory module, such as a single in-line memory module (SIMM) or a dual in-line memory module (DIMM). In some implementations, memory controller 100 may be communicatively coupled to a memory module having a DRAM and an AltMem. In some implementations, memory controller 100 may be communicatively coupled to a first memory module having a DRAM, and to a second memory module having an AltMem. In FIG. 1, memory controller 100 includes processor 102 and machine-readable storage medium 104.

Processor 102 may include a central processing unit (CPU), microprocessor (e.g., semiconductor-based microprocessor), and/or other hardware device suitable for retrieval and/or execution of instructions stored in machine-readable storage medium 104. Processor 102 may fetch, decode, and/or execute instructions 106, 108, and 110 to enable reducing read latency of a memory module, as described below. As an alternative or in addition to retrieving and/or executing instructions, processor 102 may include an electronic circuit comprising a number of electronic components for performing the functionality of instructions 106, 108, and/or 110.

Machine-readable storage medium 104 may be any suitable electronic, magnetic, optical, or other physical storage device that contains or stores executable instructions. Thus, machine-readable storage medium 104 may include, for example, a random-access memory (RAM), an Electrically Erasable Programmable Read-Only Memory (EEPROM), a storage device, an optical disc, and the like. In some implementations, machine-readable storage medium 104 may include a non-transitory storage medium, where the term "non-transitory" does not encompass transitory propagating signals. As described in detail below, machine-readable storage medium 104 may be encoded with a set of executable instructions 106, 108, and 110.

Instructions 106 may transmit write data for storing in a DRAM and AltMem. As used herein, the term "write data" should be understood to refer to data that is transmitted for storage in a memory. The write data may be written to the DRAM and to the AltMem. In some implementations, write data may be transmitted over a data bus that is shared by the DRAM and the AltMem. In some implementations, a first data bus may be used to transmit write data to the DRAM, and a second data bus may be used to transmit write data to the AltMem.

Instructions 108 may determine a DRAM read latency time for executing a read command and an AltMem read latency time for executing the read command. Determination of a read latency time may be based on various factors, such as timing specifications of a particular type of memory. For example, when issuing a read command to a DRAM, a row activation command (e.g., RAS command) and row address may be sent first, and the DRAM timing specification may specify how much time/how many clock cycles to wait before a column activation command (e.g., CAS command) and column address are sent. When issuing a read command to an AltMem, row activation and column activation commands (if applicable) and addresses may be sent in back-to-back clock cycles.

Locality may also be used to determine read latency time. For example, read latency time for executing a read command directed at an address on an open page on a DRAM may be short, especially if the address is in the same row as the address at which the preceding read command was directed. Read latency time may be longer for executing a read command directed at an address that is not on an open page on the DRAM, since opening a page takes more clock cycles than accessing an already-open page, and since a currently open page may have to be closed and the new page opened before the address may be accessed. In addition, physical location of an address may affect read latency time (e.g., addresses in certain physical region of an AltMem may be accessed more quickly than other regions).

Instructions 110 may receive, if the DRAM read latency time is greater than the AltMem read latency time, data read from the AltMem in response to the read command. The read command may be issued to the AltMem if the DRAM read latency time is greater than the AltMem read latency time. In some implementations, the data read from the AltMem may be received on a data bus shared by the AltMem and the DRAM. In some implementations, the data read from the AltMem may be received on a data bus that is different from a data bus on which data read from the DRAM is received.

In some implementations, the read command may be issued to the AltMem and to the DRAM if the DRAM read latency time is greater than the AltMem read latency time. Issuing a first read command to the DRAM, even though the AltMem may be able to provide the desired information faster, may "prime" the DRAM for a subsequent command (i.e., access part of the DRAM such that the DRAM read latency time for executing the subsequent read command is reduced), resulting in the DRAM read latency time for executing the subsequent read command being less than the AltMem read latency time for executing the subsequent read command. For example, if the first read command to the DRAM results in a page miss, the DRAM read latency time for executing the first read command may be greater than the AltMem read latency time for executing the first read command. If the first read command is issued to both the DRAM and the AltMem, data read in response to the first read command may be received from the AltMem first, but issuing the first read command to the DRAM as well may cause the appropriate page to be opened on the DRAM and allow exploitation of the DRAM's high throughput if subsequent read commands are directed at addresses that are on the opened page and near the address at which the first read command was directed. DRAM read latencies for executing such subsequent read commands may be less than AltMem read latencies for executing the same commands. "Priming" the DRAM may be especially useful when several read commands are issued in succession that are directed at addresses in the same row of the DRAM.

If the DRAM read latency time for executing a read command is greater than the AltMem read latency time for executing the read command, and the read command is issued to the AltMem as well as to the DRAM, the data read from the DRAM in response to the read command may not be used. For example, a switch may be opened to prevent the DRAM from driving the data onto a data bus, or a memory controller may ignore the data when it is received. In some implementations, a portion of the read command, rather than the full read command, may be issued to the DRAM to "prime" the DRAM for subsequent commands without unnecessary reading of data from the DRAM. Issuing a portion of the read command may allow an appropriate row of the DRAM to be activated in preparation for future read commands while saving resources that would be used for a complete DRAM read operation (as well as resources that would be used to prevent the DRAM from driving data onto a data bus). For example, a row activation command corresponding to the read command may be issued to the DRAM, but a column activation command corresponding to the read command may not be issued, preventing completion of a read operation while readying (i.e., "priming") the DRAM for a future read command to the same row.

In some implementations, the DRAM and the AltMem may be on the same memory module (e.g., hybrid DIMM). A memory controller may transmit a read command to a memory module controller on the memory module. The memory module controller may control access to the DRAM and to the AltMem, and may determine whether to issue the read command to the DRAM or to the AltMem. The memory module controller may issue the read command to the AltMem if the DRAM read latency time for executing the read command is greater than the AltMem read latency time for executing the read command, and issue the read command to the DRAM otherwise. In some implementations, the memory module controller may issue the read command to the AltMem and to the DRAM (e.g., to "prime" the DRAM) if the DRAM read latency time is greater than the AltMem read latency time. The memory controller may not comply with the DRAM timing specification when transmitting read commands to the memory module controller (e.g., the memory controller may transmit complete row activation and column activation commands and address information on back-to-back clock cycles). The memory module controller may follow the appropriate timing specification when issuing the read command to either the DRAM or AltMem.

In some implementations, the DRAM may be on a first memory module (e.g. SIMM or DIMM), the AltMem may be on a second memory module, and a memory controller may transmit commands for the DRAM over a command bus that is different from the command bus used to transmit commands for the AltMem. In such implementations, the memory controller may issue a read command to the AltMem over the AltMem command bus if the DRAM read latency time is greater than the AltMem read latency time, and issue the read command to the DRAM over the DRAM command bus otherwise. In some implementations, the memory controller may issue the read command in parallel over both command buses (i.e., issue the same read command to the DRAM and to the AltMem, for example to "prime" the DRAM) if the DRAM read latency time is greater than the AltMem read latency time. The memory controller may follow a DRAM timing specification when transmitting read commands over the DRAM command bus, and may not follow the DRAM timing specification when transmitting read commands over the AltMem command bus. A DRAM memory module controller on the first memory module may receive read commands transmitted over the DRAM command bus, and an AltMem memory module controller on the second memory module may receive read commands transmitted over the AltMem command bus.

In some implementations, the DRAM may be on a first memory module (e.g. SIMM or DIMM), the AltMem may be on a second memory module, and a memory controller may issue commands for the DRAM and commands for the AltMem over the same command bus. The memory controller may issue a read command to the AltMem if the DRAM read latency time is greater than the AltMem read latency time, and may issue a read command to the DRAM otherwise. In some implementations, the memory controller may issue the same read command twice, first to the AltMem and then to the DRAM (e.g., to "prime" the DRAM), if the DRAM read latency time is greater than the AltMem read latency time. The memory controller may follow a DRAM timing specification when issuing read commands to the DRAM, and may not follow the DRAM timing specification when issuing read commands to the AltMem.

A DRAM memory module controller on the first memory module may receive and process read commands on the command bus that are issued to the DRAM, and may ignore read commands on the command bus that are issued to the AltMem. An AltMem memory module controller on the second memory module may receive and process read commands on the command bus that are issued to the AltMem, and may ignore read commands on the command bus that are issued to the DRAM. In some implementations, the memory controller may issue a read command to the AltMem and signal the DRAM memory module controller to also act on the read command. For example, the memory controller may drive a chip select pin of the first memory module, or use a reserved DDR command encoding value, to signal the DRAM memory module controller to translate an AltMem read command on the command bus into a DRAM read command. Thus, the memory controller may "prime" the DRAM without sending the same read command twice on the command bus.

Figure 2:
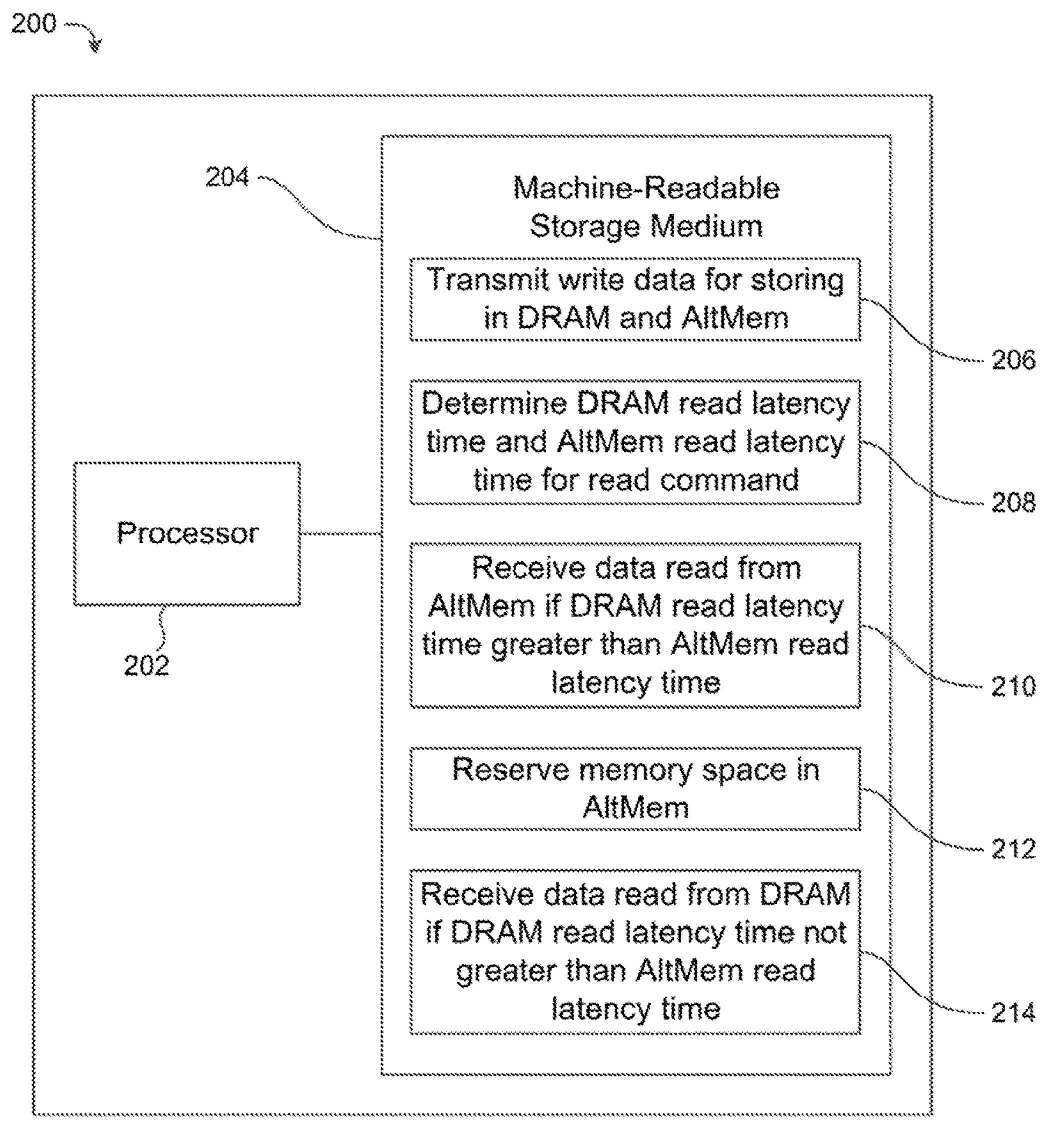
FIG. 2 is a block diagram of an example memory controller that includes a machine-readable storage medium encoded with instructions to reserve memory space in an alternative memory.

FIG. 2 is a block diagram of an example memory controller 200 that includes a machine-readable storage medium encoded with instructions to reserve memory space in an AltMem. Memory controller 200 may be may be communicatively coupled to a memory module, such as a SIMM or DIMM. In some implementations, memory controller 200 may be communicatively coupled to a memory module having a DRAM and an AltMem. In some implementations, memory controller 200 may be communicatively coupled to a first memory module having a DRAM, and to a second memory module having an AltMem. In FIG. 2, memory controller 200 includes processor 202 and machine-readable storage medium 204.

As with processor 102 of FIG. 1, processor 202 may include a CPU, microprocessor (e.g., semiconductor-based microprocessor), and/or other hardware device suitable for retrieval and/or execution of instructions stored in machine-readable storage medium 204. Processor 202 may fetch, decode, and/or execute instructions 206, 208, 210, 212, and 214. As an alternative or in addition to retrieving and/or executing instructions, processor 202 may include an electronic circuit comprising a number of electronic components for performing the functionality of instructions 206, 208, 210, 212, and/or 214.

As with machine-readable storage medium 104 of FIG. 1, machine-readable storage medium 204 may be any suitable physical storage device that stores executable instructions. Instructions 206, 208, and 210 on machine-readable storage medium 204 may be analogous to (e.g., have functions and/or components similar to) instructions 106, 108, and 110 on machine-readable storage medium 104. Instructions 212 may reserve, in the AltMem, a memory space as large as that of the DRAM. Data written to the AltMem may be written to the reserved memory space. In some implementations, the DRAM may be one of a plurality of DRAM devices on a memory module, and instructions 212 may reserve, in the AltMem, a memory space as large as the collective memory space of the plurality of DRAM devices. The reserved memory space in the AltMem may be in a low latency zone of the AltMem. An address map or lookup table that indicates which DRAM addresses correspond to which AltMem addresses may be generated/stored in memory controller 200 during boot time of the memory controller. Data written to a particular address in the DRAM may also be written to the corresponding address in the AltMem. Memory controller 200 may use the address map/lookup table to determine an appropriate DRAM address and AltMem address for a system read/write request.

Instructions 214 may receive data read from the DRAM in response to a read command if a DRAM read latency time (e.g., determined by instructions 208) for executing the read command is not greater than an AltMem read latency time (e.g., determined by instructions 208) for executing the read command. The read command may be issued to the DRAM and not to the AltMem if the DRAM read latency time is not greater than the AltMem read latency time. The DRAM read latency time may not be greater than the AltMem read latency time if, for example, the read command is directed at an address on an open page of the DRAM.

Figure 3:
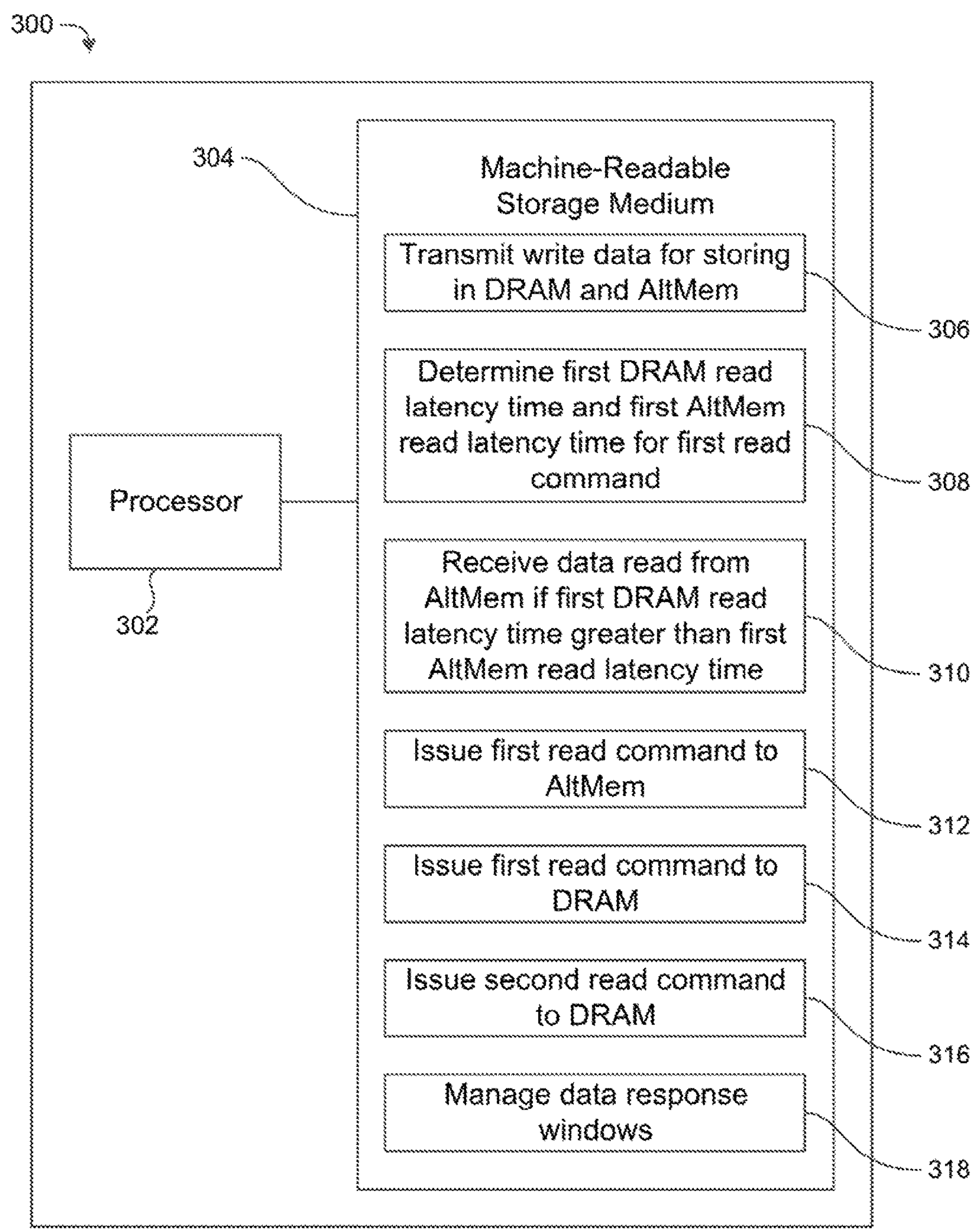
FIG. 3 is a block diagram of an example memory controller that includes a machine-readable storage medium encoded with instructions to issue a first and a second read command to a DRAM.

FIG. 3 is a block diagram of an example memory controller 300 that includes a machine-readable storage medium encoded with instructions to issue a first and a second read command to a DRAM. Memory controller 300 may be communicatively coupled to a first memory module (e.g., SIMM or DIMM) that includes a DRAM, and to a second memory module that includes an AltMem. The first and second memory modules may share memory buses. For example, memory controller 300 may issue commands to the DRAM and to the AltMem using the same command bus, and may receive data read from the DRAM and data read from the AltMem on the same data bus. In FIG. 3, memory controller 300 includes processor 302 and machine-readable storage medium 304.

As with processor 102 of FIG. 1, processor 302 may include a CPU, microprocessor (e.g., semiconductor-based microprocessor), and/or other hardware device suitable for retrieval and/or execution of instructions stored in machine-readable storage medium 304. Processor 302 may fetch, decode, and/or execute instructions 306, 308, 310, 312, 314, 316, and 318. As an alternative or in addition to retrieving and/or executing instructions, processor 302 may include an electronic circuit comprising a number of electronic components for performing the functionality of instructions 306, 308, 310, 312, 314, 316 and/or 318.

As with machine-readable storage medium 104 of FIG. 1, machine-readable storage medium 304 may be any suitable physical storage device that stores executable instructions. Instructions 306, 308, and 310 on machine-readable storage medium 304 may be analogous to instructions 106, 108, and 110 on machine-readable storage medium 104. Instructions 308 may determine a first DRAM read latency time for executing a first read command and a first AltMem read latency time for executing the first read command. Instructions 312 may issue, if the first DRAM read latency time is greater than the first AltMem read latency time, the first read command to the AltMem. The DRAM read latency time may be greater than the AltMem read latency time if, for example, the first read command is directed at an address on a page that is not open on the DRAM.

Instructions 314 may issue, if the first DRAM read latency time is greater than the first AltMem read latency time, the first read command to the DRAM after the first read command is issued to the AltMem. The first read command may be issued to the DRAM to "prime" the DRAM for a subsequent command, as discussed above. In some implementations, the first read command that is issued to the AltMem may be translated into a DRAM read command, rather than instructions 314 issuing a separate first read command to the DRAM, as discussed above with respect to FIG. 1. Data, that is read from the DRAM in response to the first read command, may be ignored or may not be received by memory controller 300 if the first DRAM read latency time is greater than the first AltMem read latency time. For example, a switch may be opened (e.g., by memory controller 300 or by a memory module controller) to decouple the DRAM from a data bus, preventing the DRAM from driving data onto the data bus. The switch may be a load-reducing switch, as discussed below.

Instructions 316 may issue a second read command to the DRAM if a second DRAM read latency time for executing the second read command is not greater than a second AltMem read latency time for executing the second read command. The second DRAM read latency time may not be greater than the second AltMem read latency time if, for example, a page on the DRAM was opened in response to the first read command and the second read command is directed at an address on the opened page. Since DRAM devices tend to have high throughput, the second DRAM read latency time may be less than the second AltMem read latency time if the second read command is directed at an address consecutive to the address to which the first read command was directed (e.g., first and second read commands are directed at addresses in adjacent columns on the same row of the DRAM). The second read command may be issued to the DRAM and not to the AltMem.

Instructions 318 may manage data response windows on a data bus such that data read from the DRAM and data read from the AltMem are not driven onto the data bus at the same time. As used herein, the term "data response window", as used with respect to a data bus, should be understood to refer to a period of time when data read from a memory (e.g., in response to a read command) is on the data bus. For example, instructions 318 may time issuances of the first read command to the AltMem and the second read command to the DRAM such that the data read from the AltMem in response to the first read command, and the data read from the DRAM in response to the second read command, do not become available at the same time.

In some implementations, instructions 318 may control load-reducing (LR) switches to prevent data, that is read from the DRAM, from being driven onto the data bus when data that is read from the AltMem is driven onto the data bus, or vice-versa. LR switches, which may be implemented with field-effect transistors (FETs) in line with the data bus, may be used to couple/decouple memory devices to the data bus and reduce load capacitance on the data bus. When data read from the DRAM is transmitted to the memory controller, instructions 318 may close the LR switch for the DRAM and open the LR switch for the AltMem (and open LR switches for other DRAMs, if any). When data read from the AltMem is transmitted to the memory controller, instructions 318 may close the LR switch for the AltMem and open the LR switch for the DRAM (and open LR switches for other DRAMs, if any). LR switches for the DRAM and for the AltMem may both be closed when write data is transmitted, since the write data is written to both types of memory. It should be understood that LR switches may be controlled by a memory controller, a memory module controller, or both.

Figure 4:
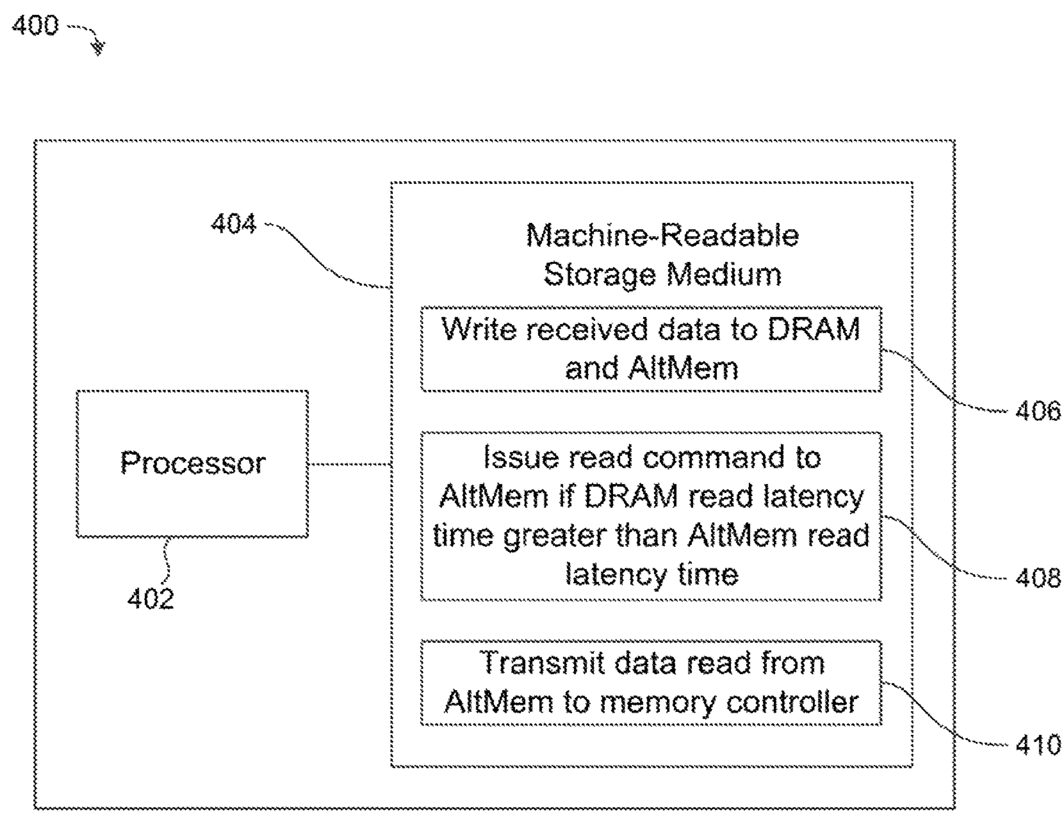
FIG. 4 is a block diagram of an example memory module controller that includes a machine-readable storage medium encoded with instructions to enable use of an alternative memory to reduce read latency of a memory module.

FIG. 4 is a block diagram of an example memory module controller 400 that includes a machine-readable storage medium encoded with instructions to enable use of an AltMem to reduce read latency of a memory module. Memory module controller 400 may control access to memory devices on a memory module, such as a SIMM or DIMM. In FIG. 4, memory module controller 400 includes processor 402 and machine-readable storage medium 404.

As with processor 102 of FIG. 1, processor 402 may include a CPU, microprocessor (e.g., semiconductor-based microprocessor), and/or other hardware device suitable for retrieval and/or execution of instructions stored in machine-readable storage medium 404. Processor 402 may fetch, decode, and/or execute instructions 406, 408, and 410 to enable use of an AltMem to reduce read latency of a memory module, as described below. As an alternative or in addition to retrieving and/or executing instructions, processor 402 may include an electronic circuit comprising a number of electronic components for performing the functionality of instructions 406, 408, and/or 410.

As with machine-readable storage medium 104 of FIG. 1, machine-readable storage medium 404 may be any suitable physical storage device that stores executable instructions. In some implementations, machine-readable storage medium 404 may include a non-transitory storage medium. As described in detail below, machine-readable storage medium 404 may be encoded with a set of executable instructions 406, 408, and 410.

Memory module controller 400 may control access to a DRAM and to an AltMem on a memory module (e.g., hybrid DIMM). Instructions 406 may write received data to the DRAM and to the AltMem. The data may be received from a memory controller, such as memory controller 100. Data written to the AltMem may be written to a reserved memory space in the AltMem, as discussed above with respect to FIG. 2.

Instructions 408 may issue a read command to the AltMem if a DRAM read latency time for executing the read command is greater than an AltMem read latency time for executing the read command. The DRAM read latency time may be greater than the AltMem read latency time if, for example, the read command is directed at an address on a page that is not open on the DRAM. In some implementations, memory module controller 400 may also issue a partial read command (e.g., row activation command/address but no column activation command/address) to the DRAM if the DRAM read latency time is greater than the AltMem read latency time. The partial read command may cause a page on the DRAM to be opened and/or a row of the DRAM to be accessed, which may lower the DRAM read latency time for the next or a subsequent read command that is issued.

Instructions 410 may transmit, to a memory controller, data read from the AltMem in response to the read command. The data may be transmitted to the memory controller via a data bus between the memory module and the memory controller. The data bus may be used to transmit data read from the AltMem as well as data read from the DRAM. Data response windows on the data bus may be managed such that data read from the DRAM and data read from the AltMem are not driven onto the data bus at the same time, as discussed further with respect to FIG. 6.

Figure 5:
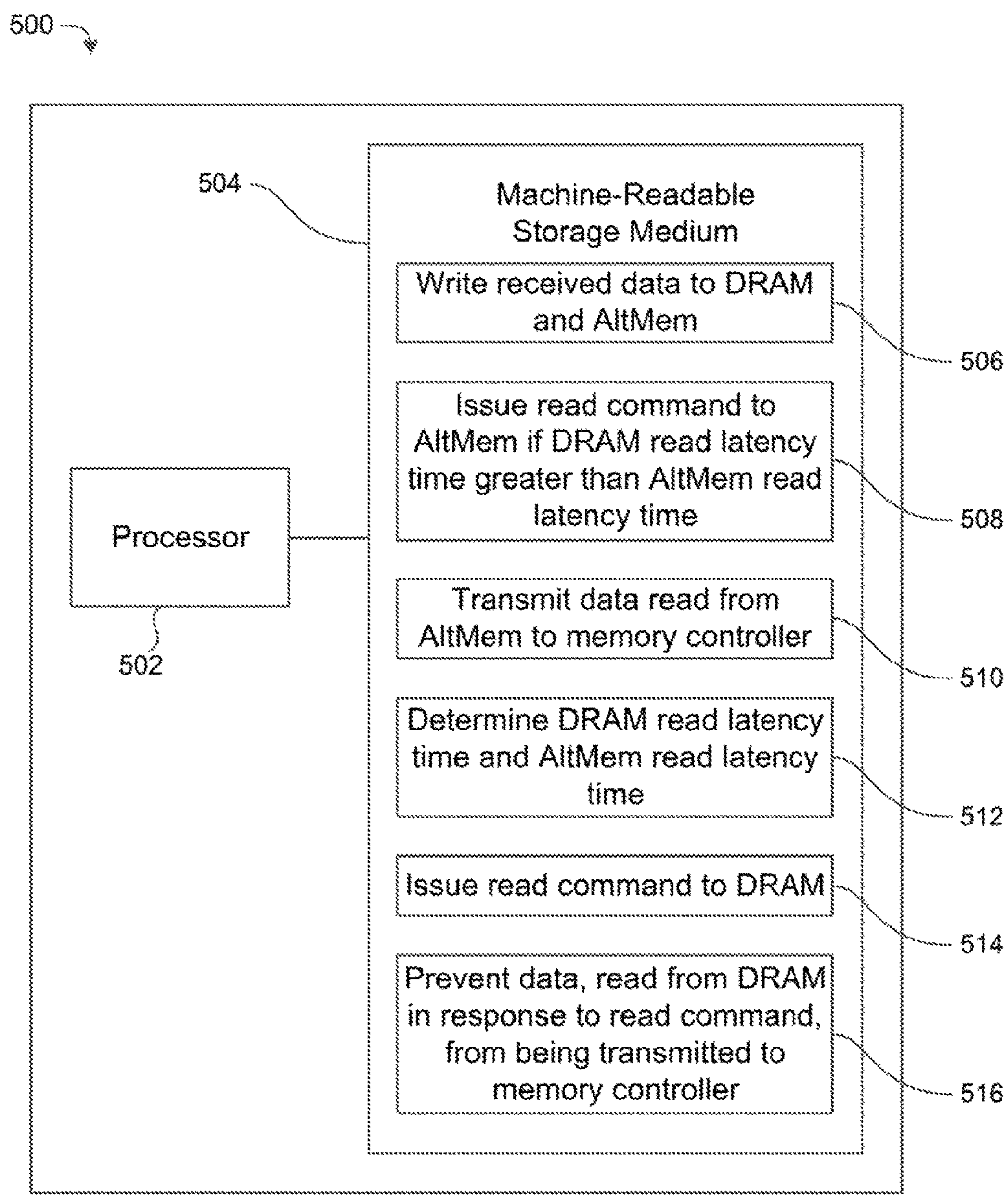
FIG. 5 is a block diagram of an example memory module controller that includes a machine-readable storage medium encoded with instructions to prevent DRAM data from being transmitted to a memory controller.

FIG. 5 is a block diagram of an example memory module controller 500 that includes a machine-readable storage medium encoded with instructions to prevent DRAM data from being transmitted to a memory controller. Memory module controller 500 may control access to memory devices on a memory module, such as a SIMM or DIMM. In FIG. 5, memory module controller 500 includes processor 502 and machine-readable storage medium 504.

As with processor 402 of FIG. 4, processor 502 may include a CPU, microprocessor (e.g., semiconductor-based microprocessor), and/or other hardware device suitable for retrieval and/or execution of instructions stored in machine-readable storage medium 504. Processor 502 may fetch, decode, and/or execute instructions 506, 508, 510, 512, 514, and 516. As an alternative or in addition to retrieving and/or executing instructions, processor 502 may include an electronic circuit comprising a number of electronic components for performing the functionality of instructions 506, 508, 510, 512, 514, and/or 516.

As with machine-readable storage medium 404 of FIG. 4, machine-readable storage medium 504 may be any suitable physical storage device that stores executable instructions. Instructions 506, 508, and 510 on machine-readable storage medium 504 may be analogous to instructions 406, 408, and 410 on machine-readable storage medium 404. Memory module controller 500 may control access to a DRAM and to an AltMem on a memory module (e.g., hybrid DIMM). Instructions 512 may determine a DRAM read latency time for executing a read command and an AltMem read latency time for executing the read command. The read command may be received from a memory controller. The determination of a read latency time may be based on various factors, such as timing specifications of a particular type of memory, locality, and/or physical location of an address, as discussed above with respect to FIG. 1.

Instructions 514 may issue the read command to the DRAM. The read command may be issued to the DRAM regardless of whether the DRAM read latency time is greater than the AltMem read latency time. If the DRAM read latency time is greater than the AltMem read latency time, the read command may be issued to the DRAM and to the AltMem. If the DRAM read latency time is not greater than the AltMem read latency time, the read command may be issued to the DRAM but not to the AltMem.

Instructions 516 may prevent data, read from the DRAM in response to the read command, from being transmitted to the memory controller if the DRAM read latency time is greater than the AltMem read latency time. In some implementations, instructions 516 may block/ignore attempts by the DRAM to drive data bits onto the data bus. In some implementations, instructions 516 may open, or coordinate with the memory controller to open, an LR switch for the DRAM to prevent the DRAM from driving data onto the data bus.

Figure 6:
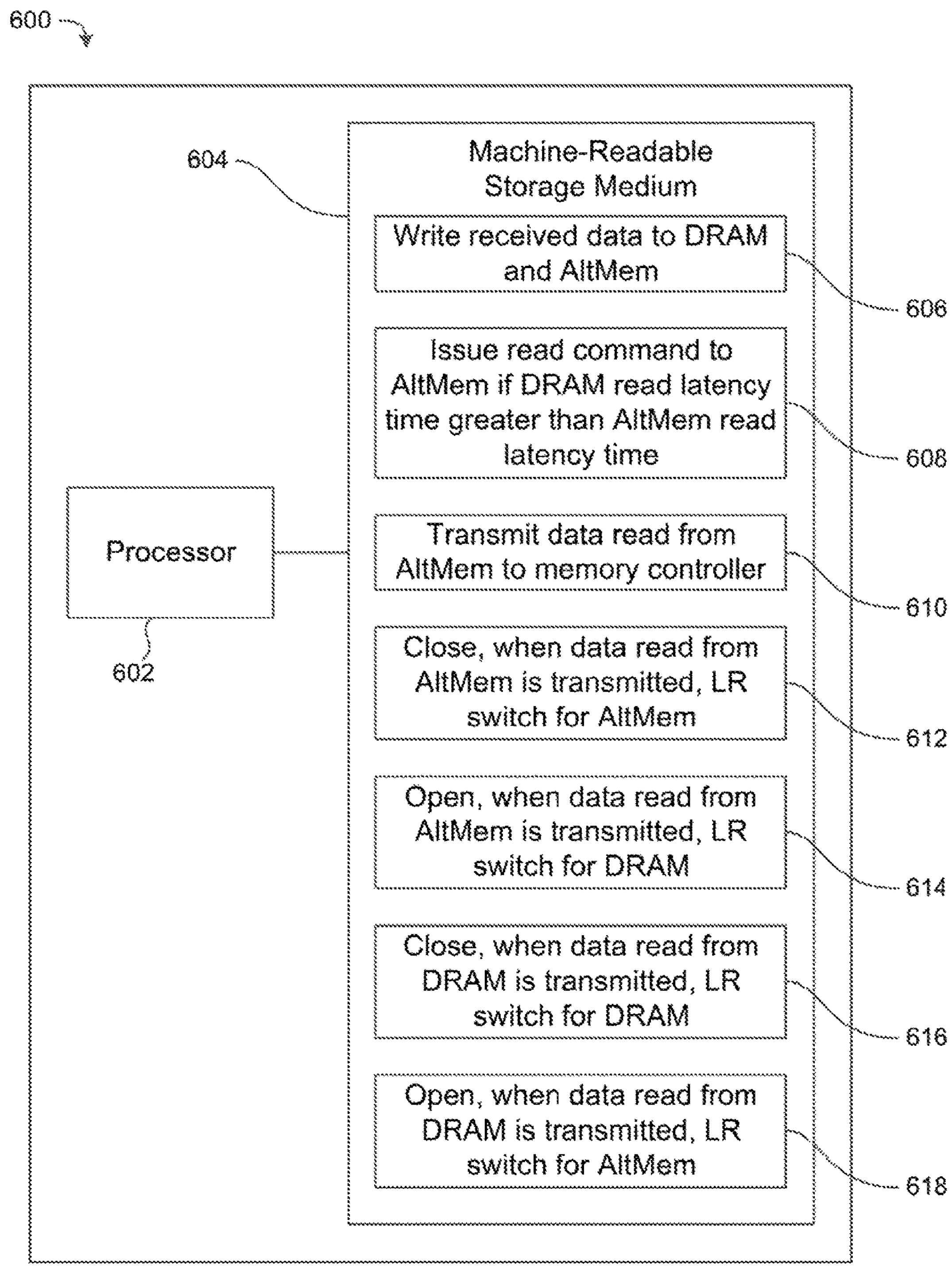
FIG. 6 is a block diagram of an example memory module controller that includes a machine-readable storage medium encoded with instructions to enable management of data response windows on a data bus.

FIG. 6 is a block diagram of an example memory module controller 600 that includes a machine-readable storage medium encoded with instructions to enable management of data response windows on a data bus. Memory module controller 600 may control access to memory devices on a memory module, such as a SIMM or DIMM. In FIG. 6, memory module controller 600 includes processor 602 and machine-readable storage medium 604.

As with processor 402 of FIG. 4, processor 602 may include a CPU, microprocessor (e.g., semiconductor-based microprocessor), and/or other hardware device suitable for retrieval and/or execution of instructions stored in machine-readable storage medium 604. Processor 602 may fetch, decode, and/or execute instructions 606, 608, 610, 612, 614, 616, and 618 to enable management of data response windows on a data bus, as described below. As an alternative or in addition to retrieving and/or executing instructions, processor 602 may include an electronic circuit comprising a number of electronic components for performing the functionality of instructions 606, 608, 610, 612, 614, 616, and/or 618.

As with machine-readable storage medium 404 of FIG. 4, machine-readable storage medium 604 may be any suitable physical storage device that stores executable instructions. Instructions 606, 608, and 610 on machine-readable storage medium 604 may be analogous to instructions 406, 408, and 410 on machine-readable storage medium 404. Memory module controller 600 may control access to a DRAM and to an AltMem on a memory module (e.g., hybrid DIMM). A data bus between the memory module and a memory controller may be used to transmit data read from the DRAM as well as data read from the AltMem. Instructions 612 may close, when data read from the AltMem is transmitted to the memory controller, an LR switch for the AltMem. Instructions 614 may open, when data read from the AltMem is transmitted to the memory controller, an LR switch for the DRAM. The data may have been read from the AltMem in response to a read command, and instructions 612 and 614 may be executed when the data is being transmitted if a DRAM read latency time for executing the read command is greater than an AltMem read latency time for executing the read command. The opening of the LR switch for the DRAM may prevent the DRAM from driving data onto the data bus while the AltMem data is being transmitted.

Instructions 616 may close, when data read from the DRAM is transmitted to the memory controller, an LR switch for the DRAM. Instructions 618 may open, when data read from the DRAM is transmitted to the memory controller, an LR switch for the AltMem. The data may have been read from the DRAM in response to a read command, and instructions 616 and 618 may be executed when the data is being transmitted if a DRAM read latency time for executing the read command is not greater than an AltMem read latency time for executing the read command. The opening of the LR switch for the AltMem may prevent the AltMem from driving data onto the data bus while the DRAM data is being transmitted.

Figure 7:
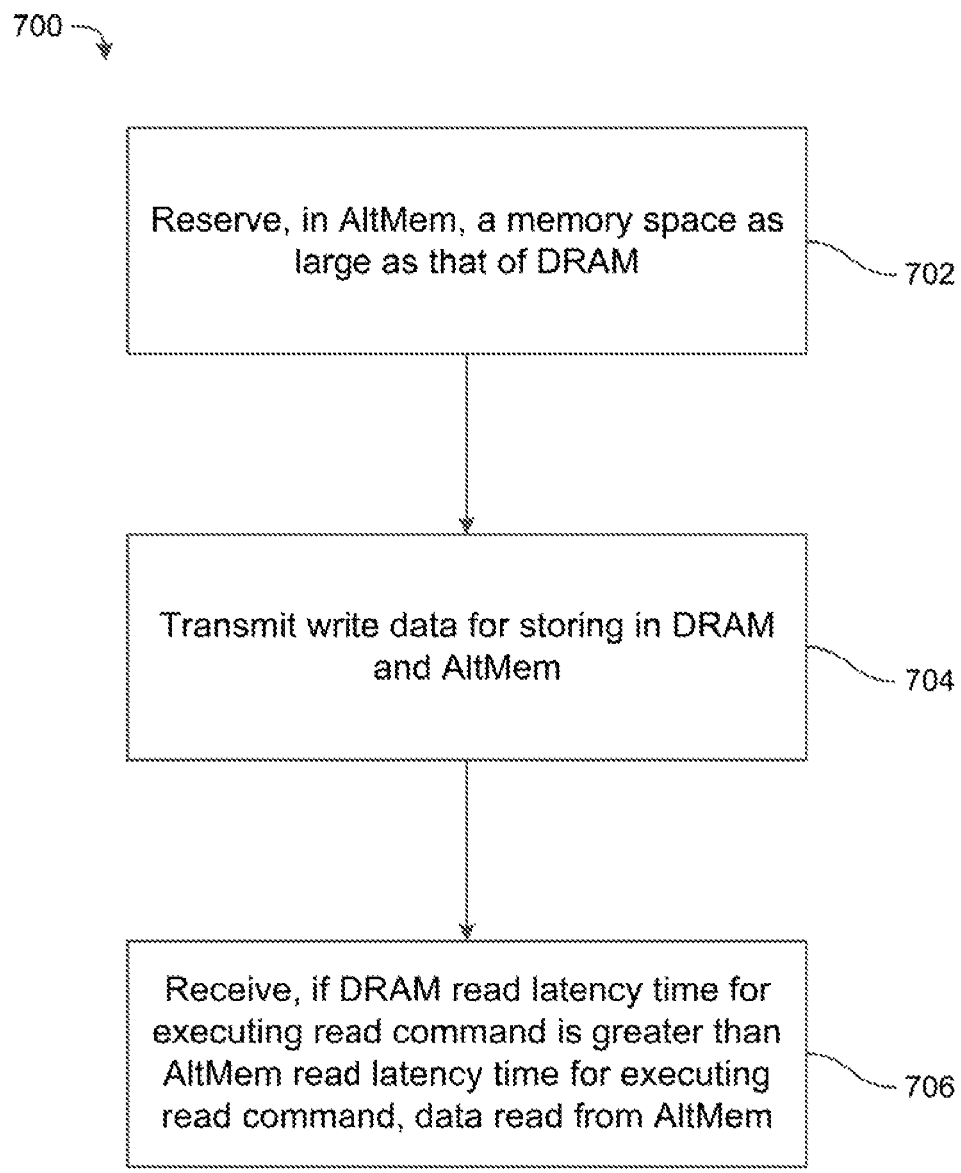
FIG. 7 is a flowchart of an example method for using an alternative memory to reduce read latency of a memory module.

Methods related to reducing read latencies are discussed with respect to FIGS. 7-11. FIG. 7 is a flowchart of an example method 700 for using an AltMem to reduce read latency of a memory module. Although execution of method 700 is described below with reference to processor 202 of FIG. 2, it should be understood that execution of method 700 may be performed by other suitable devices, such as processors 102 and 302 of FIGS. 1 and 3, respectively. Method 700 may be implemented in the form of executable instructions stored on a machine-readable storage medium and/or in the form of electronic circuitry.

Method 700 may start in block 702, where processor 202 may reserve, in an AltMem, a memory space as large as that of a DRAM. The AltMem and DRAM may be on the same memory module (e.g., SIMM or DIMM), or on different memory modules. In some implementations, the DRAM may be one of a plurality of DRAM devices on a memory module, and processor 202 may reserve, in the AltMem, a memory space as large as the collective memory space of the plurality of DRAM devices.

Next, in block 704, processor 202 may transmit write data for storing in the DRAM and AltMem. The write data may be written to the DRAM and to the reserved memory space in the AltMem. In some implementations, write data may be transmitted over a data bus that is shared by the DRAM and the AltMem. In some implementations, a first data bus may be used to transmit write data to the DRAM, and a second data bus may be used to transmit write data to the AltMem.

Finally, in block 706, processor 202 may receive, if a DRAM read latency time for executing a read command is greater than an AltMem read latency time for executing the read command, data read from the AltMem in response to the read command. The read command may be issued to the AltMem if the DRAM read latency time is greater than the AltMem read latency time. In some implementations, the read command, or a portion of it, may also be issued to the DRAM to "prime" the DRAM for a subsequent command, as discussed above with respect to FIG. 1. For example, if the DRAM read latency time is greater than the AltMem read latency time, a row activation command corresponding to the read command may be issued to the DRAM, and a column activation command corresponding to the read command may not be issued to the DRAM. In some implementations, the data read from the AltMem may be received on a data bus shared by the AltMem and the DRAM. In some implementations, the data read from the AltMem may be received on a data bus that is different from a data bus on which data read from the DRAM is received.

Figure 8:
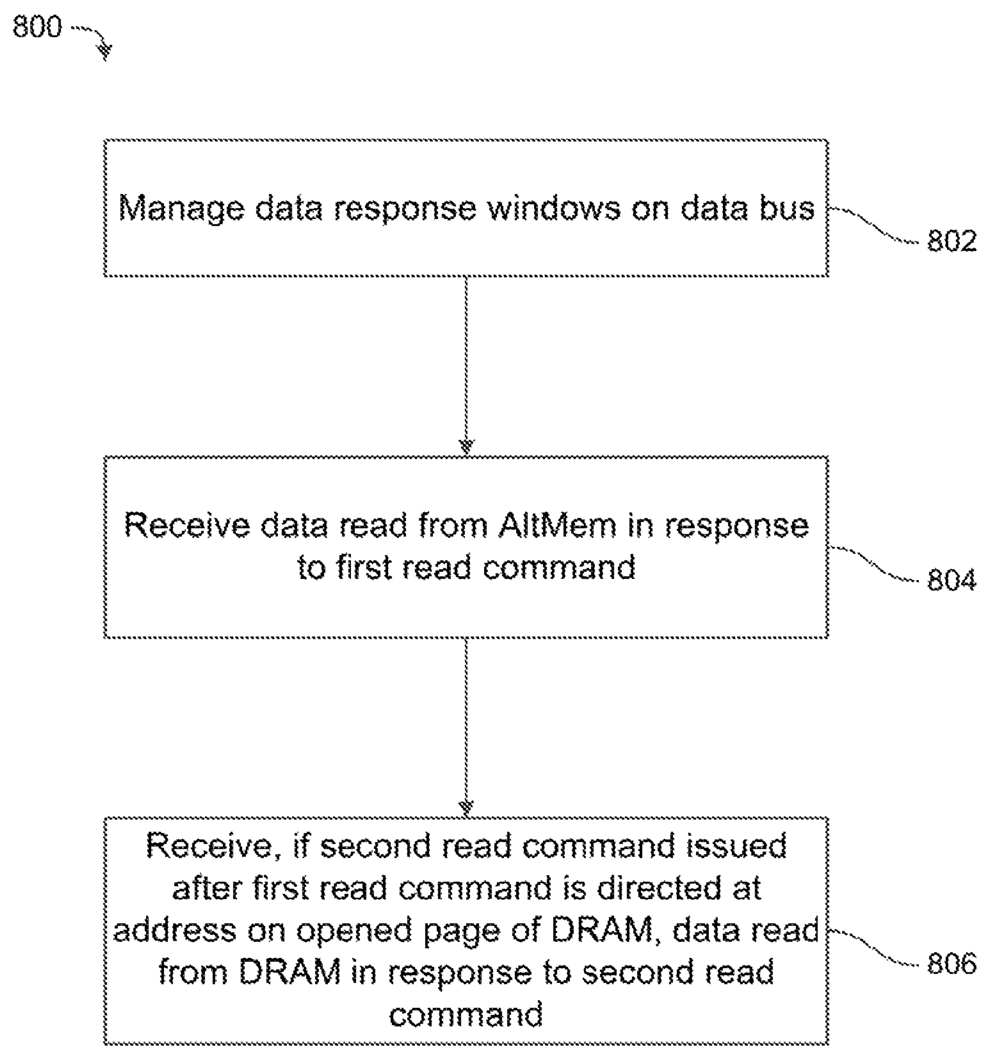
FIG. 8 is a flowchart of an example method for managing data response windows on a data bus.

FIG. 8 is a flowchart of an example method 800 for managing data response windows on a data bus. Although execution of method 800 is described below with reference to processor 302 of FIG. 3, it should be understood that execution of method 800 may be performed by other suitable devices, such as processors 102 and 202 of FIGS. 1 and 2, respectively. Some blocks of method 800 may be performed in parallel with and/or after method 700. Method 800 may be implemented in the form of executable instructions stored on a machine-readable storage medium and/or in the form of electronic circuitry.

Method 800 may start in block 802, where processor 302 may manage data response windows on a data bus. Data response windows on a shared data bus may be managed such that data read from a DRAM and data read from an AltMem are not driven onto the data bus at the same time. In some implementations, processor 302 may time issuances of a first read command to the AltMem and a second read command to the DRAM such that the data read from the AltMem in response to the first read command, and the data read from the DRAM in response to the second read command, do not become available at the same time. The second read command may be issued after the first read command. In some implementations, processor 302 may open and close LR switches for the DRAM and the AltMem at appropriate times, as discussed above with respect to FIG. 3. Although block 802 is shown above blocks 804 and 806 in FIG. 8, it should be understood that elements of block 802 may be executed after or in parallel with elements of blocks 804 and/or 806.

In block 804, processor 302 may receive data read from the AltMem in response to the first read command. The first read command may be issued to the AltMem if the DRAM read latency time for executing the first read command is greater than the AltMem read latency time for executing the first read command. In some implementations, the first read command may be issued to the DRAM and to the AltMem. A page on the DRAM may be opened in response to the first read command, but processor 302 may not receive data read from the DRAM in response to the first read command, as discussed above with respect to FIG. 3.

In block 806, processor 302 may receive, if the second read command issued after the first read command is directed at an address on the opened page on the DRAM, data read from the DRAM in response to the second read command. The second read command may be issued to the DRAM and not issued to the AltMem if a DRAM read latency time for executing the second read command is not greater than an AltMem read latency time for executing the second read command. In some implementations, data read from the AltMem and data read from the DRAM may be received on the same data bus. In some implementations, data read from the AltMem may be received on a first data bus, and data read from the DRAM may be received on a second data bus. In such implementations, data read from the AltMem may be driven onto the first data bus at the same time as data read from the DRAM is driven onto the second data bus, and management of data response windows may be performed for each data bus to ensure that data is driven onto the data bus during an available/open cycle on the respective data bus.

Figure 9:
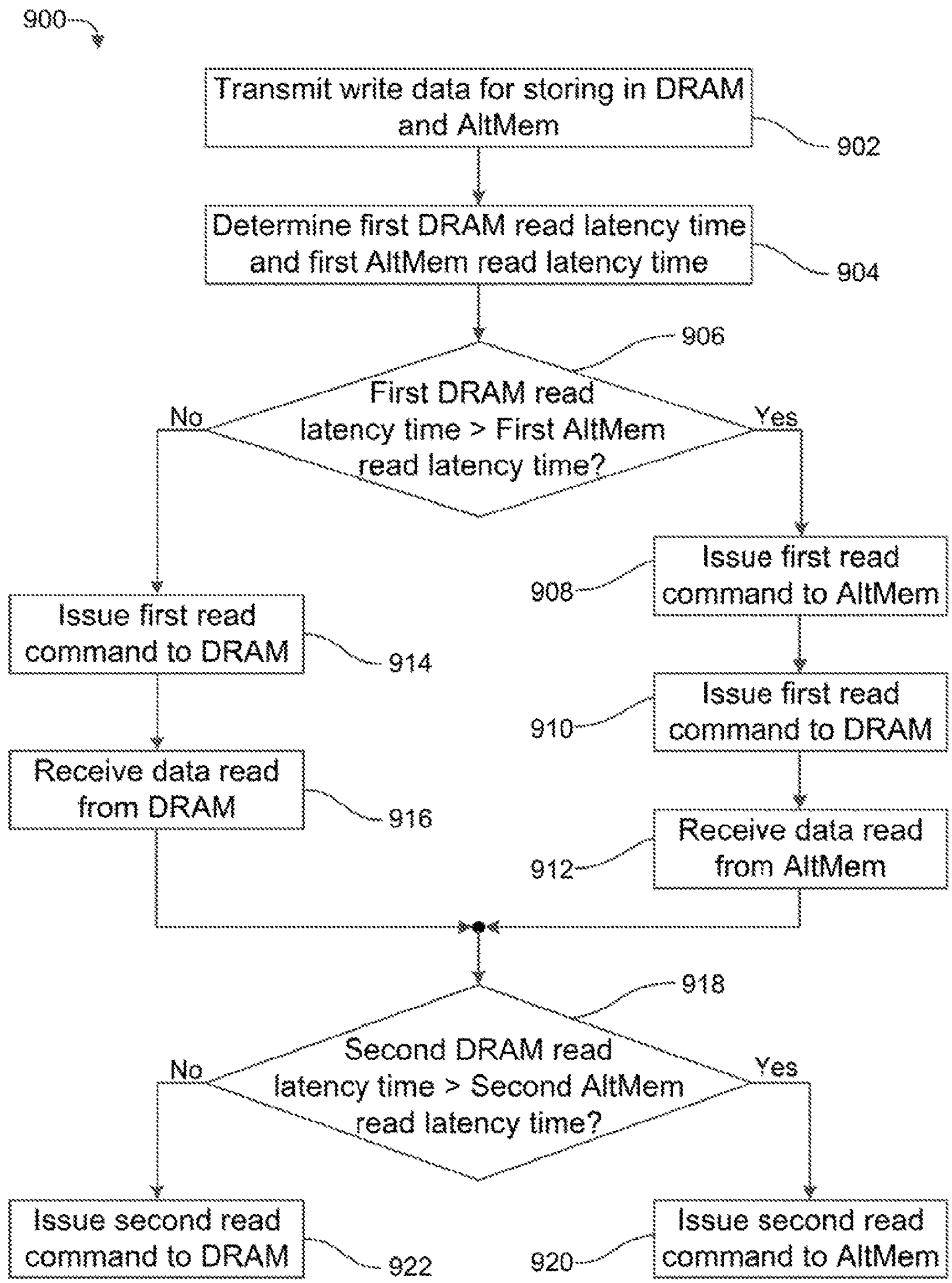
FIG. 9 is a flowchart of an example method for reducing read latencies for a first read command and a second read command.

FIG. 9 is a flowchart of an example method 900 for reducing read latencies for a first read command and a second read command. Although execution of method 900 is described below with reference to processor 302 of FIG. 3, it should be understood that execution of method 900 may be performed by other suitable devices, such as processors 102 and 202 of FIGS. 1 and 2, respectively. Some blocks of method 900 may be performed in parallel and/or after methods 700 or 800. Method 900 may be implemented in the form of executable instructions stored on a machine-readable storage medium and/or in the form of electronic circuitry.

Method 900 may start in block 902, where processor 302 may transmit write data for storing in a DRAM and AltMem. The write data may be transmitted over a data bus that is shared by the DRAM and the AltMem. The write data may be written to the DRAM, which may be on a first memory module, and to the AltMem, which may be on a second memory module. The memory space in the AltMem to which the write data is written may be a reserved memory space, as discussed above with respect to FIG. 2.

Next, in block 904, processor 302 may determine a first DRAM read latency time for executing a first read command and a first AltMem read latency time for executing the first read command. The determination of a read latency time may be based on various factors, such as timing specifications of a particular type of memory, locality, and/or physical location of an address, as discussed above with respect to FIG. 1.

In block 906, processor 302 may determine whether the first DRAM read latency time is greater than the first AltMem read latency time. If the first DRAM read latency time is greater than the first AltMem read latency time, method 900 may proceed to block 908, in which processor 302 may issue the first read command to the AltMem. Next, in block 910, processor 302 may issue the first read command to the DRAM. The first read command may be issued to the DRAM to "prime" the DRAM for a subsequent command, and data read from the DRAM in response to the first read command may not be received, as discussed above with respect to FIG. 3.

In block 912, processor 302 may receive data read from the AltMem in response to the first read command issued in block 908. The data read from the AltMem may be received on the data bus shared by the AltMem and the DRAM. Method 900 may then proceed to block 918. Although block 912 is shown below block 910 in FIG. 9, it should be understood that data read from the AltMem may be received before or in parallel with issuing the first read command to the DRAM.

If, in block 906, processor 302 determines that the first DRAM read latency time is not greater than the first AltMem read latency time, method 900 may proceed to block 914, in which processor 302 may issue the first read command to the DRAM. Processor 302 may not issue the first read command to the AltMem if the first DRAM read latency time is not greater than the first AltMem read latency time.

Next, processor 302 may receive data read from the DRAM in response to the first read command issued in block 914. The data read from the DRAM may be received on the data bus shared by the AltMem and the DRAM. Method 900 may then proceed to block 918.

In block 918, processor 302 may determine whether a second DRAM read latency time for executing a second read command is greater than a second AltMem read latency time for executing the second read command. Although block 918 is shown below blocks 912 and 916 in FIG. 9, it should be understood that the determination of block 918 may be made before data read from the DRAM or AltMem is received, or while the data is still being received. If the second DRAM read latency time is greater than the second AltMem read latency time, method 900 may proceed to block 920, in which processor 302 may issue the second read command to the AltMem. In some implementations, the second read command, or a portion of it, may also be issued to the DRAM to "prime" the DRAM for a subsequent command.

If, in block 918, processor 302 determines that the second DRAM read latency time is not greater than the second AltMem read latency time, method 900 may proceed to block 922, in which processor 302 may issue the second read command to the DRAM. The second command may not be issued to the AltMem if the second DRAM read latency time is not greater than the second AltMem read latency time.

Figure 10:
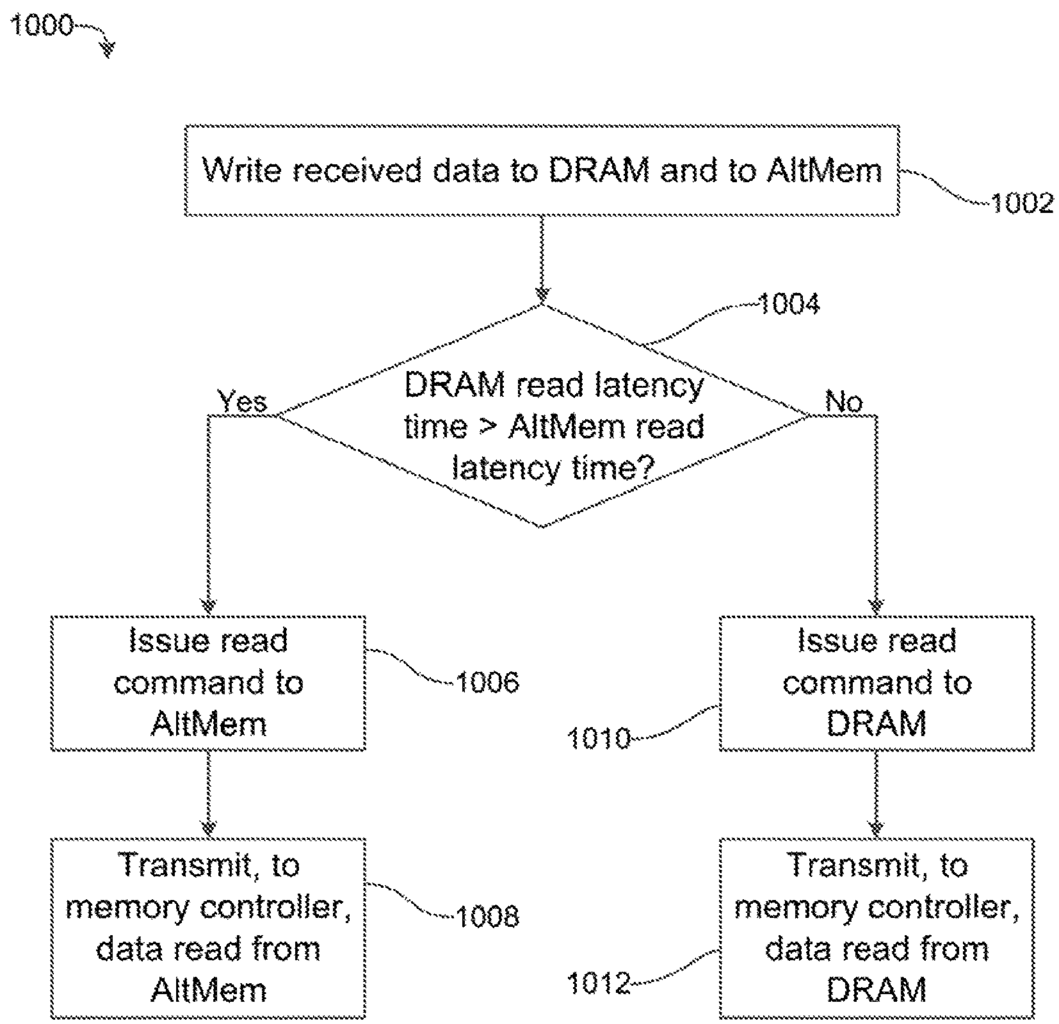
FIG. 10 is a flowchart of an example method for determining whether to transmit data read from a DRAM or data read from an alternative memory in response to a read command.

FIG. 10 is a flowchart of an example method 1000 for determining whether to transmit data read from a DRAM or data read from an AltMem in response to a read command. Although execution of method 1000 is described below with reference to processor 402 of FIG. 4, it should be understood that execution of method 1000 may be performed by other suitable devices, such as processors 502 and 602 of FIGS. 5 and 6, respectively. Method 1000 may be implemented in the form of executable instructions stored on a machine-readable storage medium and/or in the form of electronic circuitry.

Method 1000 may start in block 1002, where processor 402 may write received data to a DRAM and to an AltMem. The DRAM and the AltMem may be on a memory module (e.g., SIMM or DIMM). The data may be received from a memory controller (e.g., memory controller 100). The memory space in the AltMem to which the data is written may be a reserved memory space, as discussed above with respect to FIG. 2.

Next, in block 1004, processor 402 may determine whether a DRAM read latency time for executing a read command is greater than an AltMem read latency time for executing the read command. The read command may be received from the memory controller. If the DRAM read latency time is greater than the AltMem read latency time, method 1000 may proceed to block 1006, in which processor 402 may issue the read command to the AltMem. In some implementations, processor 402 may also send a portion of the read command (e.g., row activation command corresponding to the read command) to the DRAM to "prime" the DRAM for a subsequent command, as discussed above.

Next, in block 1008, processor 402 may transmit, to the memory controller, data read from the AltMem in response to the read command issued in block 1006. The data may be transmitted over a data bus between the memory module and the memory controller. The data bus may be used to transmit data read from the AltMem as well as data read from the DRAM.

If, in block 1004, processor 402 determines that the DRAM read latency time is not greater than the AltMem read latency time, method 1000 may proceed to block 1010, in which processor 402 may issue the read command to the DRAM. Processor 402 may not issue the read command to the AltMem if the DRAM read latency time is not greater than the AltMem read latency time.

Next, in block 1012, processor 402 may transmit, to the memory controller, data read from the DRAM in response to the read command issued in block 1010. The data may be transmitted over the data bus between the memory module and the memory controller.

Figure 11:
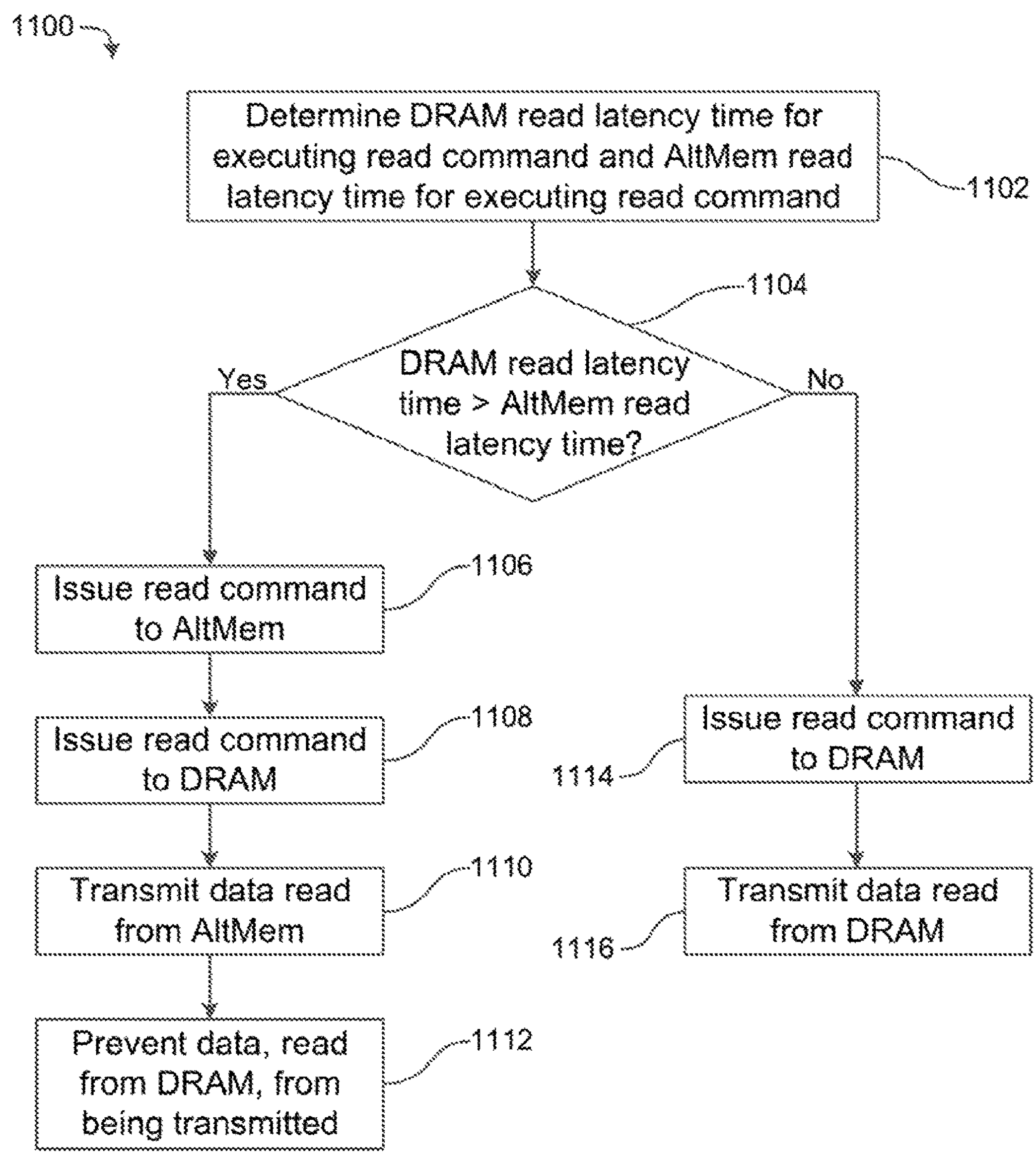
FIG. 11 is a flowchart of an example method for "priming" a DRAM for a read command.

FIG. 11 is a flowchart of an example method 1100 for "priming" a DRAM for a read command. Although execution of method 1100 is described below with reference to processor 502 of FIG. 5, it should be understood that execution of method 1100 may be performed by other suitable devices, such as processors 402 and 602 of FIGS. 4 and 6, respectively. Method 1100 may be implemented in the form of executable instructions stored on a machine-readable storage medium and/or in the form of electronic circuitry.

Method 1100 may start in block 1102, where processor 502 may determine a DRAM read latency time for executing a read command and an AltMem read latency time for executing the read command. The read command may be received from a memory controller. The DRAM and the AltMem may be on a memory module (e.g., SIMM or DIMM). The determination of a read latency time may be based on various factors, such as timing specifications of a particular type of memory, locality, and/or physical location of an address, as discussed above with respect to FIG. 1.

Next, in block 1104, processor 502 may determine whether the DRAM read latency time is greater than the AltMem read latency time. If the DRAM read latency time is greater than the AltMem read latency time, method 1100 may proceed to block 1106, in which processor 502 may issue the read command to the AltMem. In block 1108, processor 502 may issue the read command to the DRAM. Although block 1108 is shown below block 1106 in FIG. 11, it should be understood that the read command may be issued to the DRAM in parallel with issuing the read command to the AltMem.

In block 1110, processor 502 may transmit, to the memory controller, data read from the AltMem in response to the read command issued in block 1106. The data may be transmitted over a data bus between the memory module and the memory controller. The data bus may be used to transmit data read from the AltMem as well as data read from the DRAM. Although block 1110 is shown below block 1108 in FIG. 11, it should be understood that data read from the AltMem may be transmitted before or in parallel with issuing the read command to the DRAM. In some implementations, processor 502 may close an LR switch for the AltMem and open an LR switch for the DRAM when data read from the AltMem is transmitted to the memory controller.

In block 1112, processor 502 may prevent data, read from the DRAM in response to the read command issued in block 1108, from being transmitted to the memory controller. In some implementations, processor 502 may open a switch (e.g., LR switch for the DRAM) to decouple the DRAM from a data bus, preventing the DRAM from driving data onto the data bus. In some implementations, processor 502 may not transmit the data read from the DRAM. Although block 1112 is shown below block 1110 in FIG. 11, it should be understood that the elements of block 1112 may be performed before or in parallel with the elements of block 1110.

If, in block 1104, processor 502 determines that the DRAM read latency time is not greater than the AltMem read latency time, method 1100 may proceed to block 1114, in which processor 502 may issue the read command to the DRAM. Processor 502 may not issue the read command to the AltMem if the DRAM read latency time is not greater than the AltMem read latency time.

Next, in block 1116, processor 502 may transmit, to the memory controller, data read from the DRAM in response to the read command issued in block 1114. The data may be transmitted over the data bus between the memory module and the memory controller. In some implementations, processor 502 may close an LR switch for the DRAM and open an LR switch for the AltMem when data read from the DRAM is transmitted to the memory controller.

The foregoing disclosure describes using AltMem to complement DRAM and reduce DRAM read latency times. Example implementations described herein enable storing the same data in an AltMem as is stored in a DRAM, and deciding on a per command basis whether to read data from the AltMem or from the DRAM.

We claim:

1. A method for using an alternative memory (AltMem) to reduce read latency of a memory module having a dynamic random-access memory (DRAM), the method comprising:

reserving, in the AltMem, a memory space as large as that of the DRAM;

transmitting write data for storing in the DRAM and AltMem, wherein the write data is written to the DRAM and to the reserved memory space in the AltMem; and receiving, if a first DRAM read latency time for executing a first read command is greater than a first AltMem read latency time for executing the first read command, data read from the AltMem in response to the first read command, wherein the first read command is issued to the AltMem if the first DRAM read latency time is greater than the first AltMem read latency time.

2. The method of claim 1, wherein the first read command is issued to the DRAM and to the AltMem, and wherein a page on the DRAM is opened in response to the first read command but data read from the DRAM in response to the first read command is not received, the method further comprising receiving, if a second read command issued to the DRAM after the first read command is directed at an address on the opened page on the DRAM, data read from the DRAM in response to the second read command.

3. The method of claim 2, wherein the second read command is issued to the DRAM and not issued to the AltMem if a second DRAM read latency time for executing the second read command is not greater than a second AltMem read latency time for executing the second read command.

4. The method of claim 2, wherein:

data read from the AltMem is received on a first data bus; and data read from the DRAM is received on a second data bus.

5. The method of claim 1, further comprising managing data response windows on a data bus such that data read from the DRAM and data read from the AltMem are not driven onto the data bus at the same time.

6. The method of claim 1, wherein if the first DRAM read latency time is greater than the first AltMem read latency time:

a row activation command corresponding to the first read command is issued to the DRAM; and a column activation command corresponding to the first read command is not issued to the DRAM.

7. The method of claim 1, further comprising:

issuing, if the first DRAM read latency time is greater than the first AltMem read latency time, the first read command to the AltMem; and issuing, if the first DRAM read latency time is greater than the first AltMem read latency time, the first read command to the DRAM after issuing the first read command to the AltMem, wherein data, that is read from the DRAM in response to the first read command, is not received if the first DRAM read latency time is greater than the first AltMem read latency time.

8. A machine-readable storage medium encoded with instructions executable by a processor of a memory controller for using an alternative memory (AltMem) to reduce read latency of a memory module having a dynamic random-access memory (DRAM), the machine-readable storage medium comprising:

instructions to reserve, in the AltMem, a memory space as large as that of the DRAM;

instructions to transmit write data for storing in the DRAM and AltMem, wherein the write data is written to the DRAM and to the AltMem, and wherein data written to the AltMem is written to the reserved memory space;

instructions to determine a first DRAM read latency time for executing a first read command and a first AltMem read latency time for executing the first read command; and instructions to receive, if the first DRAM read latency time is greater than the first AltMem read latency time, data read from the AltMem in response to the first read command, wherein the first read command is issued to the AltMem if the first DRAM read latency time is greater than the first AltMem read latency time.

9. The machine-readable storage medium of claim 8, further comprising instructions to receive, if the first DRAM read latency time is not greater than the first AltMem read latency time, data read from the DRAM in response to the first read command, wherein the first read command is issued to the DRAM and not to the AltMem if the first DRAM read latency time is not greater than the first AltMem read latency time.

10. The machine-readable storage medium of claim 8, further comprising:

instructions to issue, if the first DRAM read latency time is greater than the first AltMem read latency time, the first read command to the AltMem;

instructions to issue, if the first DRAM read latency time is greater than the first AltMem read latency time, the first read command to the DRAM after the first read command is issued to the AltMem, wherein data, that is read from the DRAM in response to the first read command, is not received if the first DRAM read latency time is greater than the first AltMem read latency time;

instructions to issue a second read command to the DRAM if a second DRAM read latency time for executing the second read command is not greater than a second AltMem read latency time for executing the second read command, wherein the second read command is issued to the DRAM after the first read command is issued to the DRAM; and instructions to manage data response windows on a data bus such that data read from the DRAM and data read from the AltMem are not driven onto the data bus at the same time.

11. The machine-readable storage medium of claim 8, wherein the first read command that is issued to the AltMem is translated into a DRAM read command.

12. A machine-readable storage medium encoded with instructions executable by a processor of a memory module for reducing read latency of the memory module, wherein the memory module comprises a dynamic random-access memory (DRAM) and an alternative memory (AltMem), the machine-readable storage medium comprising:

instructions to reserve, in the AltMem, a memory space as large as that of the DRAM;

instructions to write received data to the DRAM and to the reserved memory space of the AltMem;

instructions to issue a read command to the AltMem if a DRAM read latency time for executing the read command is greater than an AltMem read latency time for executing the read command; and instructions to transmit, to a memory controller, data read from the AltMem in response to the read command.

13. The machine-readable storage medium of claim 12, the machine-readable storage medium further comprising:

instructions to determine the DRAM read latency time and the AltMem read latency time;

instructions to issue the read command to the DRAM; and instructions to prevent data, read from the DRAM in response to the read command, from being transmitted to the memory controller if the DRAM read latency time is greater than the AltMem read latency time.

14. The machine-readable storage medium of claim 12, further comprising:

instructions to close, when data read from the AltMem is transmitted to the memory controller, a load-reducing (LR) switch for the AltMem;

instructions to open, when data read from the AltMem is transmitted to the memory controller, an LR switch for the DRAM;

instructions to close, when data read from the DRAM is transmitted to the memory controller, an LR switch for the DRAM; and instructions to open, when data read from the DRAM is transmitted to the memory controller, an LR switch for the AltMem.

15. The machine-readable storage medium of claim 12, further comprising:

instructions to manage data response windows on a data bus such that data read from the DRAM and data read from the AltMem are not driven onto the data bus at the same time.

16. The machine-readable storage medium of claim 12, further comprising:

wherein the read command that is issued to the AltMem is translated into a DRAM read command.

* * * * *